US00RE43205E

(19) United States
(12) Reissued Patent
Sumner et al.

(10) Patent Number: US RE43,205 E
(45) Date of Reissued Patent: Feb. 21, 2012

(54) SKILL BASED CHAT FUNCTION IN A COMMUNICATION SYSTEM

(75) Inventors: Roger Sumner, Batavia, IL (US); Anthony Dezonno, Bloomingdale, IL (US)

(73) Assignee: Aspect Software, Inc., Lombard, IL (US)

(21) Appl. No.: 11/484,829

(22) Filed: Jul. 11, 2006

Related U.S. Patent Documents

Reissue of:
(64) Patent No.: 7,058,169
Issued: Jun. 6, 2006
Appl. No.: 10/649,539
Filed: Aug. 27, 2003

(51) Int. Cl.
*H04M 3/00* (2006.01)
*H04M 5/00* (2006.01)

(52) U.S. Cl. ..... 379/265.02; 379/265.01; 379/265.09; 379/265.12; 379/265.14; 379/266.1; 379/309

(58) Field of Classification Search ..... 379/265.01, 379/265.02, 265.09, 265.12, 265.14, 266.01, 379/309
See application file for complete search history.

(56) References Cited

U.S. PATENT DOCUMENTS

| | | | | |
|---|---|---|---|---|
| 5,206,903 | A | 4/1993 | Kohler et al. | |
| 5,555,179 | A | 9/1996 | Koyama et al. | |
| 5,765,033 | A | 6/1998 | Miloslavsky | |
| 5,825,869 | A * | 10/1998 | Brooks et al. | 379/265.12 |
| 5,926,539 | A | 7/1999 | Shtivelman | |
| 5,953,332 | A | 9/1999 | Miloslavsky | |
| 5,953,405 | A | 9/1999 | Miloslavsky | |
| 5,964,387 | A | 10/1999 | Stapleton | |
| 6,002,760 | A | 12/1999 | Gisby | |
| 6,021,428 | A | 2/2000 | Miloslavsky | |
| 6,044,368 | A | 3/2000 | Powers | |
| 6,067,357 | A | 5/2000 | Kishinsky et al. | |
| 6,108,711 | A | 8/2000 | Beck et al. | |
| 6,138,139 | A | 10/2000 | Beck et al. | |
| 6,167,395 | A | 12/2000 | Beck et al. | |
| 6,170,011 | B1 | 1/2001 | Beck et al. | |
| 6,175,563 | B1 | 1/2001 | Miloslavsky | |

(Continued)

FOREIGN PATENT DOCUMENTS

| | | | |
|---|---|---|---|
| GB | 2 293 724 | A | 4/1996 |

(Continued)

*Primary Examiner* — Quynh Nguyen
(74) *Attorney, Agent, or Firm* — Husch Blackwell LLP

(57) ABSTRACT

The apparatus and method provide assistance to an agent in a communication system, such as a communication system having an automatic call distributor. The method has the steps of determining skills of each agent of a plurality of agents, storing the determined skills for respective agents of the plurality of agents as skill records in a database, retrieving the skill record of a predetermined agent from the database, comparing the skill record of the predetermined agent to the skill records of the other agents in the database, selecting an agent from the plurality of agents based on the comparison of skill records, and establishing communication between the predetermined agent and the selected agent. The skill record of a predetermined agent is retrieved when the predetermined agent of the plurality of agents requests to communicate with another of the agents of the plurality of agents. The apparatus implements the method. The method and apparatus provide the ability for an agent or an inbound caller to solicit assistance from a group of similarly or higher skilled agents, especially in remote environments where, in the case of an agent, the agent does not have direct contact with other agents.

47 Claims, 5 Drawing Sheets

U.S. PATENT DOCUMENTS

| | | | | |
|---|---|---|---|---|
| 6,175,564 | B1 | 1/2001 | Miloslavsky et al. | |
| 6,185,292 | B1 | 2/2001 | Miloslavsky | |
| 6,345,305 | B1 | 2/2002 | Beck et al. | |
| 6,373,836 | B1 | 4/2002 | Deryugin et al. | |
| 6,389,007 | B1 | 5/2002 | Shenkman et al. | |
| 6,393,015 | B1 | 5/2002 | Shtivelman | |
| 6,535,492 | B2 * | 3/2003 | Shtivelman | 370/270 |
| 6,707,904 | B1 * | 3/2004 | Judkins et al. | 379/265.06 |
| 6,711,253 | B1 * | 3/2004 | Prabhaker | 379/265.01 |
| 6,732,156 | B2 | 5/2004 | Miloslavsky | |
| 6,832,203 | B1 * | 12/2004 | Villena et al. | 705/8 |
| 6,937,715 | B2 * | 8/2005 | Delaney | 379/265.09 |
| 7,110,525 | B1 * | 9/2006 | Heller et al. | 379/265.11 |
| 7,221,377 | B1 | 5/2007 | Okita et al. | |
| 2002/0073162 | A1 * | 6/2002 | McErlean | 709/206 |
| 2002/0122544 | A1 * | 9/2002 | Williams et al. | 379/207.02 |
| 2002/0196926 | A1 * | 12/2002 | Johnson et al. | 379/265.02 |
| 2003/0095652 | A1 * | 5/2003 | Mengshoel et al. | 379/265.06 |
| 2003/0169870 | A1 * | 9/2003 | Stanford | 379/265.12 |

FOREIGN PATENT DOCUMENTS

| | | |
|---|---|---|
| WO | WO 00/27102 | 5/2000 |

* cited by examiner

SKILL BASED CHAT FUNCTION IN A COMMUNICATION SYSTEM

Matter enclosed in heavy brackets [ ] appears in the original patent but forms no part of this reissue specification; matter printed in italics indicates the additions made by reissue.

FIELD OF THE INVENTION

The field of the invention relates to communication systems and, in particular, to systems with automatic call distributors.

BACKGROUND OF THE INVENTION

Automatic call distribution systems are known. Such systems are typically used, for example, within private branch telephone exchanges as a means of distributing telephone calls among a group of agents. While the automatic call distributor may be a separate part of a private branch telephone exchange, often the automatic call distributor is integrated into and is an indistinguishable part of the private branch telephone exchange.

Often an organization disseminates a single telephone number to its customers and to the pubic in general as a means of contacting the organization. As calls are directed to the organization from the public switch telephone network, the automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are software routines and algorithms that are operatively connected and/or part of the automatic call distributor.

Automatic call distributors are utilized in communications handling centers, such as telephone call centers, that forward incoming communications, such as telephone calls, for processing by one of several associated call-handling agents. Other communications centers may be used to forward voice-over-internet protocol communications; electronic mail messages; facsimiles or the like, to associated handling agents.

Telephone call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents are typically trained to process certain call subject matters and certain call languages.

In known telephone call centers, computerized automatic call distributors place incoming telephone calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a telephone call center agent may speak multiple languages, and may therefore be able to process telephone calls relating to a particular subject matter in all these languages. One simple approach used to deal with multiple agent attributes is to create and administer individual queues, each of which takes into account the subject matter and the attributes of the agent. This, however, is administratively very cumbersome.

Other known telephone call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call is placed on hold. One basic technique of minimizing on-hold time is to employ a first-in/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call should be handled by an agent who either has the ability to produce the most revenue or can handle the call in the shortest amount of time. Also, when an agent becomes available to handle a new call, the agent should handle either the call that has the possibility of generating the most revenue or the call that the agent is most efficient in handling.

Although known automatic call distribution systems provide many features. there is still a need in the prior art for a system that provides the ability for an agent or an inbound caller to solicit assistance from a group of similarly or higher skilled agents, especially in remote environments where, in the case of an agent, the agent does not have direct contact with other agents. These known systems do not have the functionality to allow agents and inbound callers to "chat" in a single environment. This results in a loss of efficiency in the amount of time it takes to obtain a response to a question. Furthermore, in the computerized "rooms" that are dedicated to a subject area, as the number of participants becomes greater, it is difficult to follow the thread of a transaction. To handle large chat sessions, providers, such as AOL, place participants into rolls, isolated from other chat members, and thereby limit the availability to find the solution to an inquiry.

Thus, there is a need in the prior art for a method and system which overcomes the disadvantages and provides the ability to match skill sets of an inquiring agent or inbound chat members with similar skill sets of agents.

SUMMARY OF THE INVENTION

One embodiment of the present invention is a method of providing assistance to an agent in an automatic call distribution system. The method has the steps of determining skills of each agent of a plurality of agents, storing the determined skills for respective agents of the plurality of agents as skill records in a database, retrieving the skill record of a predetermined agent from the database, comparing the skill record of the predetermined agent to the skill records of the other agents in the database, selecting an agent from the plurality of agents based on the comparison of skill records, and establishing communication between the predetermined agent and the selected agent. The skill record of a predetermined agent is retrieved when the predetermined agent of the plurality of agents requests to communicate with another of the agents of the plurality of agents.

In another embodiment of the present invention, the present invention is an apparatus that comprises a skilled determination module that determines skills of each agent of the plurality of agents. It also includes a database in which is stored as skill records the determined skills for respective agents of the plurality of agents, the database being operatively connected to the skill determination module. Also included is a retrieving module that is operatively connected to the database. The retrieving module, when an predetermined agent of a plurality of agents requests to communicate with another of the agents of the plurality of agents, retrieves the skill record of a predetermined agent from the database. Also included is a comparator, which compares the skill records of a predetermined agent to the skill records of the other agents in the database. The comparator outputs comparisons of the skill records of the predetermined agent and the other agents. A selector receives the output of the comparator and in response thereto selects an agent from a plurality of agents based on the comparison of skill records. The communication module then establishes communication between the predetermined agent and the selected agent.

BRIEF DESCRIPTION OF THE DRAWINGS

The features of the present invention, which are believed to be novel, are set forth with particularity in the appended claims. The invention, together with further objects and advantages, may best be understood by reference to the following description taken in conjunction with the accompanying drawings and in the several figures of which like reference numerals identify like elements, and in which:

DETAILED DESCRIPTION OF THE INVENTION

Figure 1:
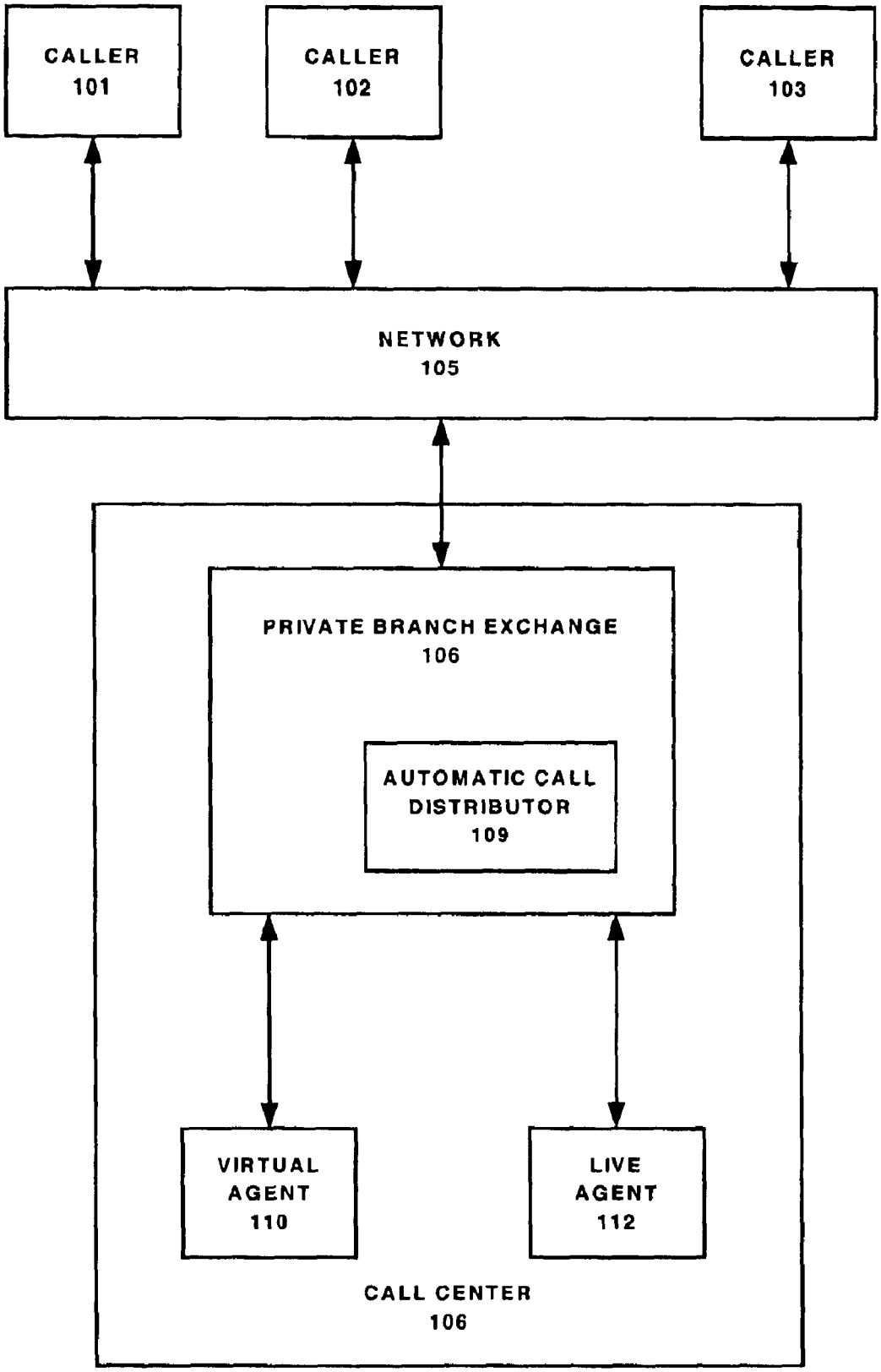
FIG. 1 is a general blocked diagram of a communications system with a call center having a public branch exchange switch with an automatic call distributor.

FIG. 1 is a block diagram of a telephone system having an automatic call distributor 109 that is part of a private branch exchange 108 in a call center 106. Calls may be connected between callers 101, 102, 103 via network 105 to the automatic call distributor 106. The automatic call distributor 106 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be a stand-alone unit, or may be integrated in a host computer, etc. The present invention may be implemented under any of number of different formats. For example, where implemented in connection with a public switch telephone network, a satellite network, a cellular or land mobile radio network, the present invention would operate within a host computer associated with the automatic call distributor and may receive voice information (such as pulse code modulation data) from a switched circuit connection which carries a voice between the callers 101, 102, 103 and the agents 110, 112.

Where the present invention is implemented in connection with the Internet, the present invention may operate from within a server. Voice information may be carried between the agents 110, 112 and callers 101, 102, 103 using packets.

As shown in FIG. 1, a caller, such as caller 101, may place a call to the call center 106. The caller 101 typically uses a station set that may be embodied as a conventional telephone, videophone or personal computer configured with appropriate telephony software and Internet connectivity. The call is routed via the telephone network 105 to the call center 100, in a conventional manner. The call is preferably routed within the call center 100 to a private branch exchange switch 108 that has an automatic call distributor 109. The private branch exchange switch 108 and the automatic call distributor 109 may comprise conventional hardware and software, as modified herein to carry out the functions and operations of the present invention.

Generally, the private branch exchange switch 108 and the automatic call distributor 109 form a switching system designed to receive calls destined for call center 100, and queue them when an appropriate agent is not available. In addition, the automatic call distributor 109 distributes calls to agents or specific groups of agents according to a prearranged scheme. The automatic call distributor 109 may be integrated with the private branch exchange 108, as in the illustrative embodiment shown in FIG. 1, or provided by a separate unit.

The telephone network 105, as used herein, includes the combination of local and long distance wire or wireless facilities and switches known as the public switched telephone network, as well as cellular network systems and the telephony feature of the Internet. The telephone network 105 is utilized to complete calls between (i) a caller at a station set, such as callers 101, 102, 103, and the call center 100; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone bill.

The Internet network, as used herein, includes the World Wide Web (the "Web") and other systems for storing and retrieving information using the Internet. To view a web site, the user communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

Figure 2:
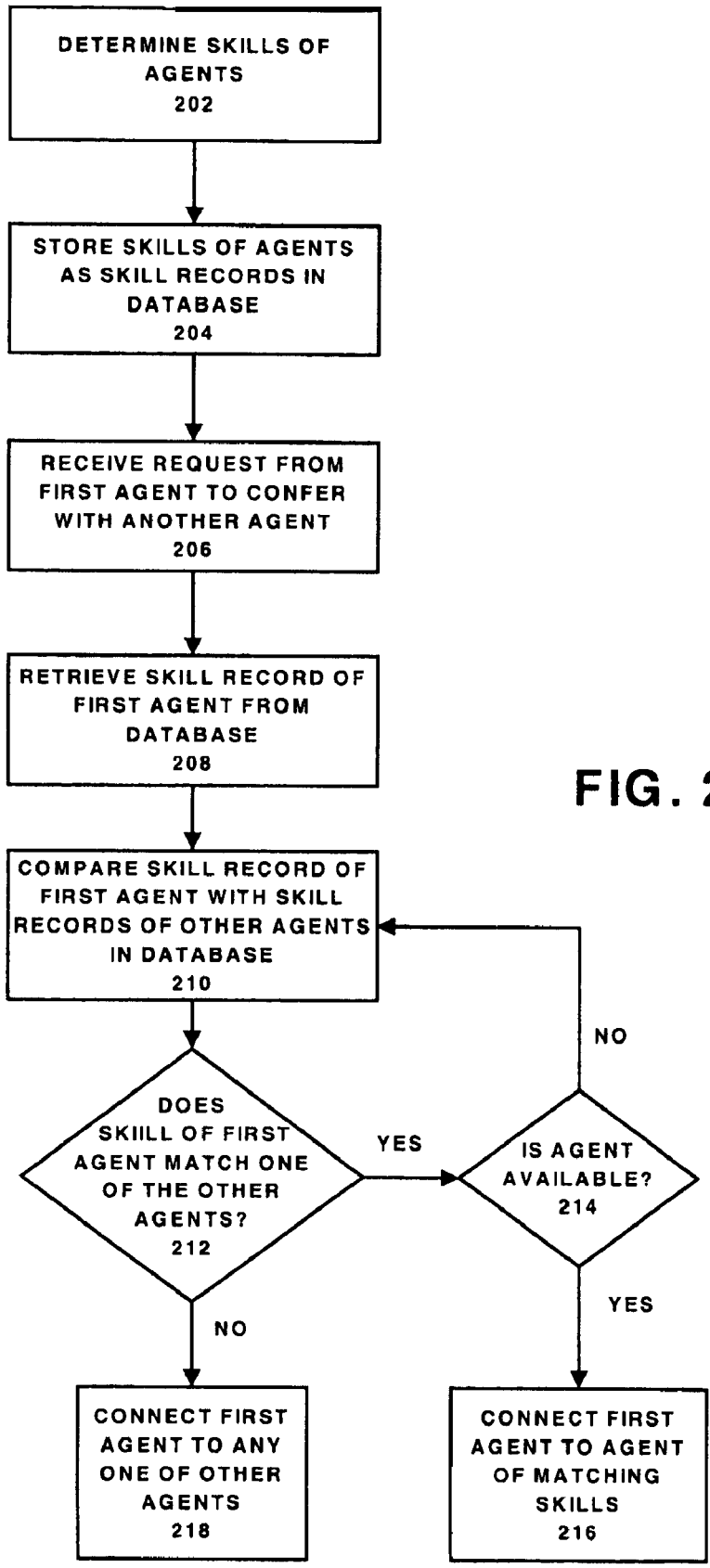
FIG. 2 is a flow diagram depicting the method of the present invention.

FIG. 2 depicts in a flow diagram the method of the present invention. Initially, the skills of each agent of a plurality of agents are determined (step 202). The determined skills for respective agents of the plurality of agents are stored as skill records in a database (step 204). When a predetermined agent of the plurality of agents requests to communicate with another of the agents, the skill record of the predetermined agent is retrieved from the database (step 206). This skill record of the predetermined agent is then compared to the skill records of the other agents in the database (step 210). In step 212, a check is made as to whether or not the skill of the first agent matches the skills of the other agents. If no match is found, then a connection with the first agent (predetermined agent) to any of the other agents is established (step 218). When a match is found, then it is determined whether this agent is available (step 214). If the agent is unavailable, then a comparison is again made in step 210. If the agent is available, however, a connection is established between the predetermined agent and the agent, which matches the skills (step 216).

Skill records that are stored in the database contain at least an agent identifier and at least one associated skill classification. A further embodiment of the present invention of the method may include determining a plurality of skill sets and then associating at least one skill set with the respective agent of the plurality of agents. At least one skill set is identified based on the determined skills of the respective agent. An identification of the respective agent, and the association of the respective agent and at least one skill set are then stored in the skill records in the database.

Figure 3:
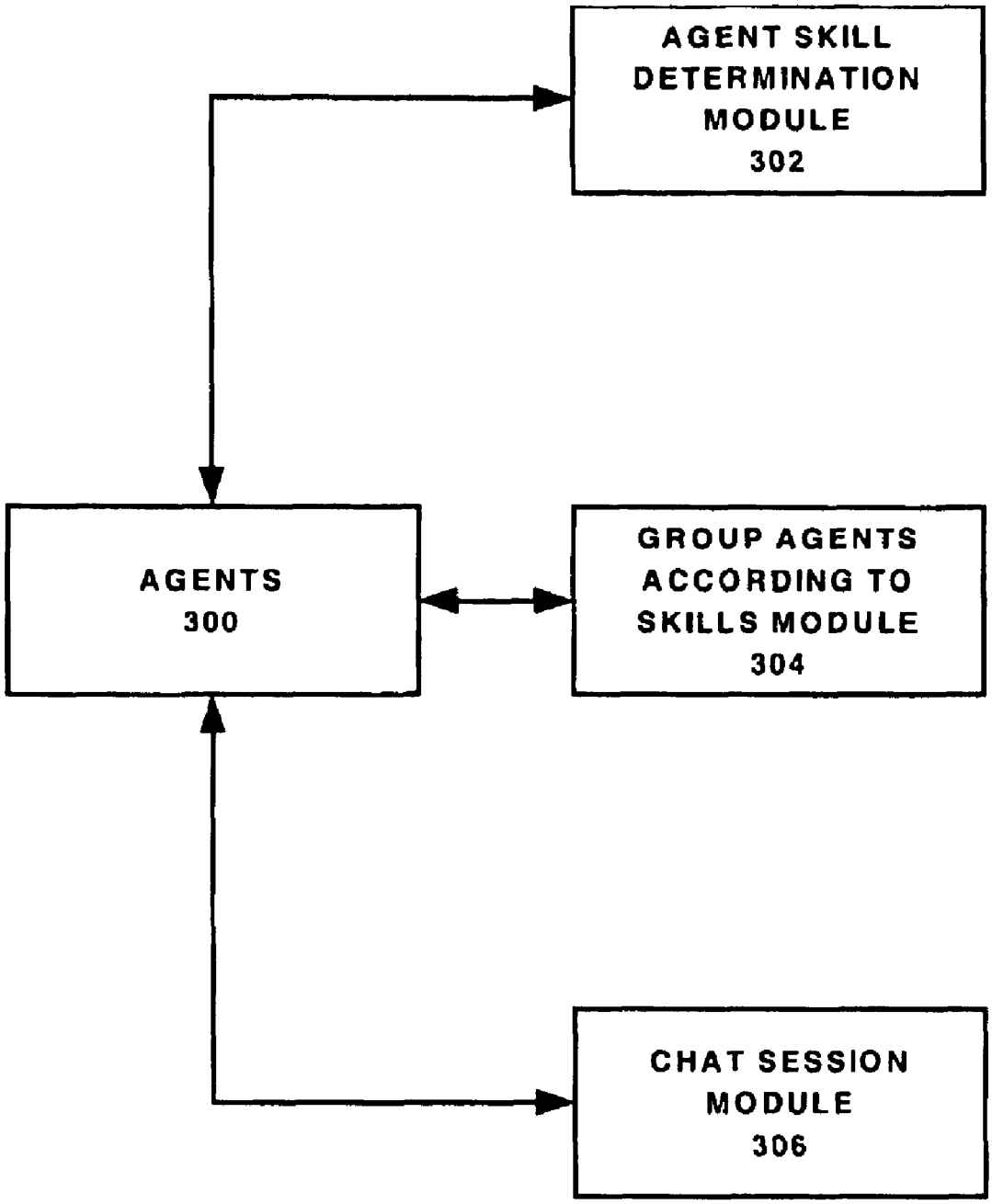
FIG. 3 is a blocked diagram depicting in general the structure of the apparatus according to the present invention.

FIG. 3 depicts a general blocked diagram of an apparatus for providing a chat function in an automatic call distribution system. The automatic call distribution system typically has a group of agents 300. A means for determining skills of each agent of the plurality of agents is implemented in an agent skill determination module 302. A means for grouping the agents according to skills thereof into a plurality of skill groups or skill sets is implemented by the group agents according to skills module 304. Finally, a means for providing the chat sessions between the agents in a respective skill group of the plurality of skill groups is implemented in a chat session module 306.

Figure 4:
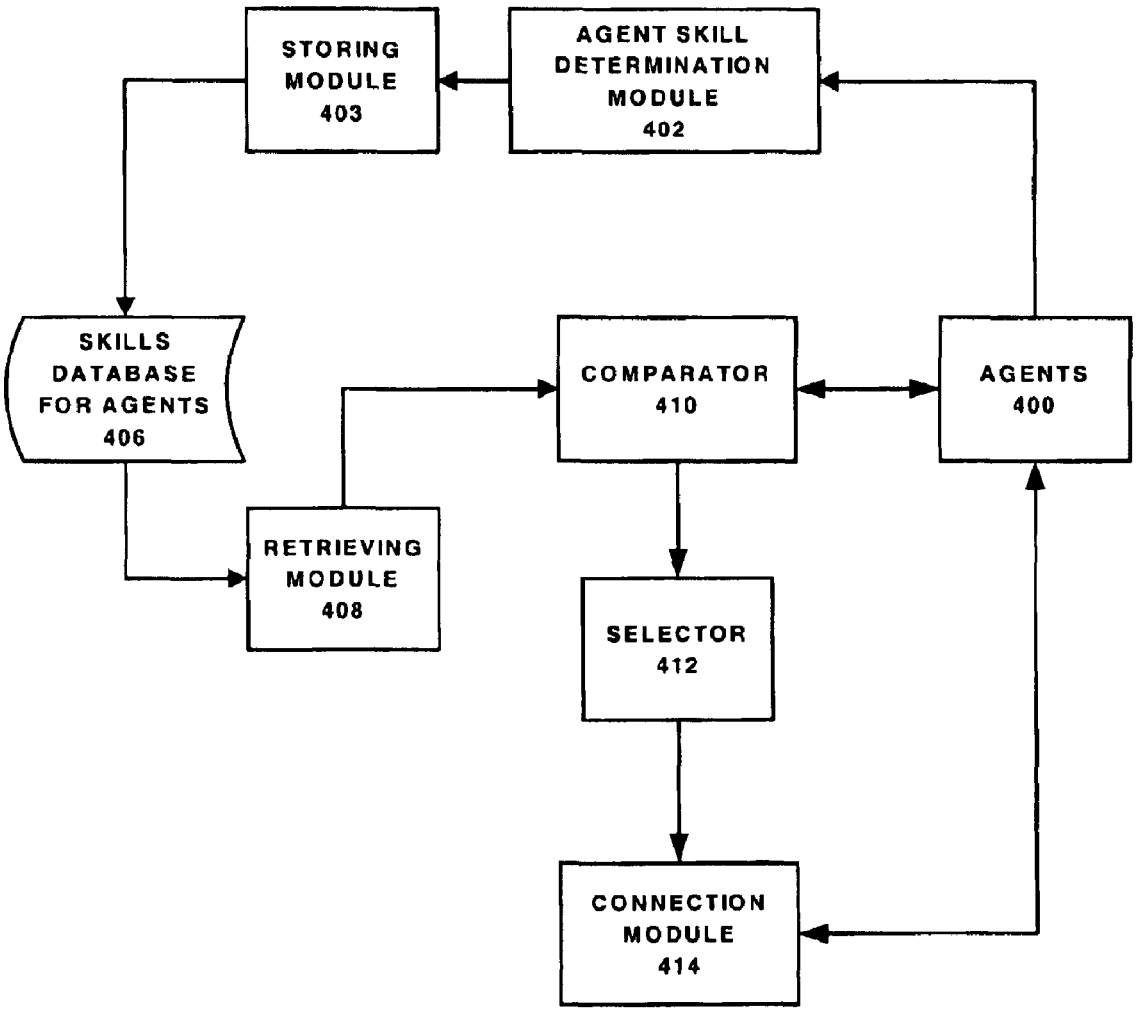
FIG. 4 is a block diagram showing in more detail the present invention.

FIG. 4 depicts another embodiment of the apparatus of the present invention in a more detailed blocked diagram. An agent skill determination module 402 is used to determine the skills of each agent of a plurality of agents 400. A storing module 404 takes the data from the agent(s) skill determination module 402 and stores in a skills database for the agents 406. The determined skills for respective agents or the plurality of agents are stored as skill records in the database 406. A retrieving module 408 obtains skill records from the database 406 and provides the data to a comparator 410. The comparator 410 compares the skill records of a predetermined agent to the skill records of other agents in the database 406. A comparator 410 outputs its results to a selector 412, which then selects an agent from the plurality of agents 400. This selection is based on the comparison of the skill records by the comparator 410. Finally, an agent connection module 414 connects the predetermined agent to the selected agent based on the data output by the selector 412.

As to be appreciated that the agent that desires to communicate with other agents may also be an inbound caller that desires to communicate with other agents of a particular skill group. Furthermore, the predetermined agent, or inbound caller, may communicate with two or more of the agents 400 that match the criteria according to the comparator 410.

Figure 5:
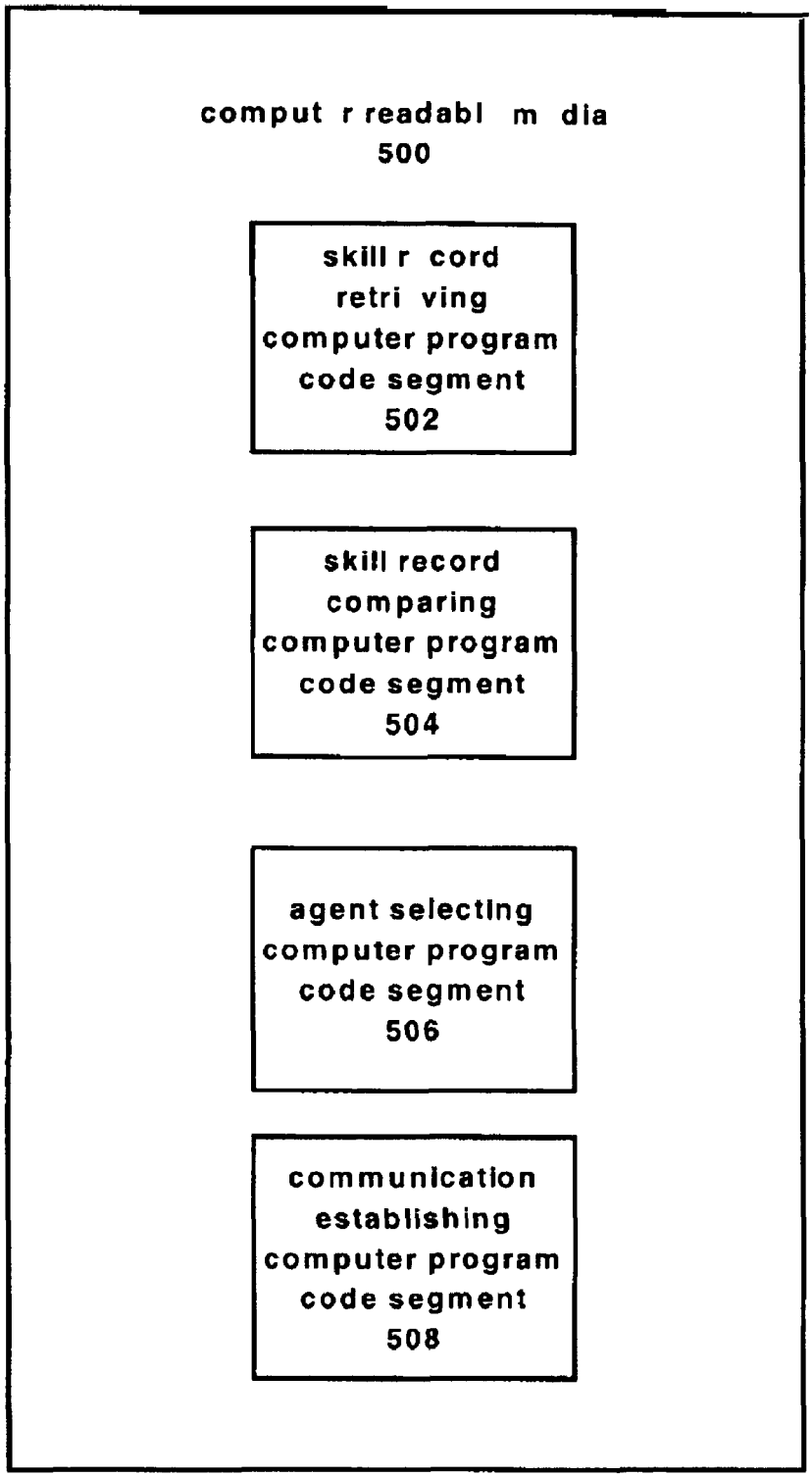
FIG. 5 depicts a computer readable media having stored therein code segments according to the present invention.

The method and apparatus of the present invention may be implemented in hardware, software, or combinations of hardware and software. In a software embodiment of the present invention is a computer program product embedded in a computer readable medium. The computer readable medium comprises a computer readable media containing code segments. As depicted in FIG. 5, the computer readable media 500 has a skill record retrieving computer program segment 502 that when a respective agent of a plurality of agents requests to communicate with another of the agents of the plurality of agents retrieves a skill record of the respective agent from a database. The computer readable media 500 also has a skill record comparing computer program code segment that compares the skill record of the predetermined agent to the skill records of the other agents in the database. The computer readable media 500 further has an agent selecting computer program code segment 506 that selects an agent from the plurality of agents based on the comparison of skill records. Finally, the computer readable media 500 has a communication establishing computer program code segment 508 that establishes communication between the predetermined agent and the selected agent. Again, it is to be pointed out that the predetermined agent may also be an inbound caller, and that the predetermined agent or inbound caller may be connected with two or more agents of the plurality of agents. Thus, with the present invention, the agents. which are first evaluated for the skill sets they contain, have the skill sets stored in a database record that can be updated as the agent obtains training or becomes more efficient, for example. When an agent selects a skill group chat function, the skill record of the agent is retrieved from the database. Agents are then assigned potentially similar skilled chat sessions based upon the skills they have. The present invention thus overcomes the drawbacks in the known systems, which fail to recognize the benefits associated with skill as a factor in determining the chat sessions to which agents are joined.

The invention is not limited to the particular details of apparatus and method depicted, and other modifications and applications are contemplated. Certain other changes may be made in the above-described apparatus and method without departing from the true spirit and scope of the invention herein involved. For example, the present invention may be utilized in various types of communication systems, other than a system using an automatic call distributor. It is intended, therefore, that the subject matter in the above depiction shall be interpreted as lusterative and not illuminating sense.

What is claimed is:

1. A method for providing assistance to an agent in a communication system *including a comparator*, comprising the steps of:

determining skills of each agent of a plurality of agents;

storing the determined skills for respective agents of the plurality of agents as skill records in a database;

retrieving, when a predetermined agent of the plurality of agents requests to communicate with another of the agents of the plurality of agents, the skill record of the predetermined agent from the database;

*the comparator* comparing the skill record of the predetermined agent to the skill records of the other agents in the database;

selecting an agent from the plurality of agents based on the comparison of skill records; and establishing communication between the predetermined agent and the selected agent.

2. The method according to claim 1, wherein the determined skills for agents are stored in skill records in a database.

3. The method according to claim 2, wherein each of the skill records contains at least an agent identifier and at least one associated skill classification.

4. The method according to claim 1, wherein a plurality of skill sets are predetermined, and wherein the method further comprises associating at least one skill set with a respective agent of the plurality of agents, the at least one skill set being identified based on the determined skills of the respective agent.

5. The method according to claim 4, wherein an identification of the respective agent, and the association of the respective agent and the at least one skill set are stored in skill records in a database.

6. A method for a chat function in an automatic call distribution system *including a comparator*, comprising the steps of:

determining skills of each agent of a plurality of agents;

receiving a request from a predetermined person for communication with one of the agents of the plurality of agents;

determining skills of the predetermined person;

*the comparator* comparing the skills *of* the predetermined person to the skills of the agents;

selecting an agent from the plurality of agents based on the comparison of skills; and establishing communication between the predetermined person and the selected agent.

7. The method according to claim 6, wherein the predetermined person is one of the agents of the plurality of agents.

8. The method according to claim 6, wherein the predetermined person is an agent that is remote from the plurality of agents.

9. The method according to claim 6, wherein the determined skills for agents are stored in skill records in a database.

10. The method according to claim 9, wherein each of the skill records contains at least an agent identifier and at least one associated skill classification.

11. The method according to claim 6, wherein a plurality of skill sets are predetermined, and wherein the method further comprises associating at least one skill set with a respective agent of the plurality of agents, the at least one skill set being identified based on the determined skills of the respective agent.

12. The method according to claim 11, wherein identification of the respective agent, and the association of the respective agent and the at least one skill set are stored in skill records in a database.

13. A method for providing a chat function in an automatic call distribution system, comprising the steps of:

*a skill determination module of the automatic call distribution system* determining *the* skills of each agent of a plurality of agents in the automatic call distribution system;

grouping the agents *in the automatic call distribution system* according to skills thereof into a plurality of skill groups; and

*a chat session module of the automatic call distribution system* providing chat [sessions] *session* between agents in a respective skill group of the plurality of skill groups.

14. The method according to claim 13, wherein the determined skills for agents are stored in skill records in a database.

15. The method according to claim 14, wherein each of the skill records contains at least an agent identifier and at least one associated skill classification.

16. The method according to claim 13, wherein a plurality of skill sets are predetermined, and wherein the method further comprises associating at least one skill set with a respective agent of the plurality of agents, the at least one skill set being identified based on the determined skills of the respective agent.

17. The method according to claim 16, wherein identification of the respective agent, and the association of the respective agent and the at least one skill set are stored in skill records in a database.

18. A [computer program product embedded in a] *non-transitory tangible* computer readable medium for use in providing assistance to an agent in an automatic call distribution system, [comprising:

a] *the* computer readable media containing code segments comprising:

a skill determining computer program code segment that determines skills of each agent of a plurality of agents;

a storing computer program code segment that stores the determined skills for respective agents of the plurality of agents as skill records in a database;

a skill record retrieving computer program code segment that, when a predetermined agent of the plurality of agents requests to communicate with another of the agents of the plurality of agents, retrieves the skill record of the predetermined agent from the database;

a skill record comparing computer program code segment that compares the skill record of the predetermined agent to the skill records of the other agents in the database;

an agent selecting computer program code segment that selects an agent from the plurality of agents based on the comparison of skill records; and a communication establishing computer program code segment that establishes communication between the predetermined agent and the selected agent.

19. A [computer program product embedded in a] *non-transitory tangible* computer readable medium for use in providing assistance to an agent in an automatic call distribution system, [comprising:

a] *the* computer readable media containing code segments comprising:

a skill record retrieving computer program code segment that, when a respective agent of a plurality of agents requests to communicate with another of the agents of the plurality of agents, retrieves a skill record of the respective agent from a database:

a skill record comparing computer program code segment that compares the skill record of the predetermined agent to the skill records of the other agents in the database;

an agent selecting computer program code segment that selects an agent from [the] *a* plurality of agents based on the comparison of skill records; and a communication establishing computer program code segment that establishes communication between the predetermined agent and the selected agent.

20. An apparatus for providing a chat function in an automatic call distribution system, comprising:

means for determining skills of each agent of a plurality of agents in the automatic call distribution system;

means for grouping the agents according to skills thereof into a plurality of skill groups; and means for providing chat sessions between agents in a respective skill group of the plurality of skill groups.

21. The apparatus according to claim 20, wherein the determined skills for agents are stored in skill records in a database.

22. The apparatus according to claim 21, wherein each of the skill records contains at least an agent identifier and at least one associated skill classification.

23. The apparatus according to claim 20, wherein a plurality of skill sets are predetermined, and wherein at least one skill set is associated with a respective agent of the plurality of agents, the at least one skill set being based on the determined skills of the respective agent.

24. The apparatus according to claim 23, wherein identification of the respective agent, and the association of the respective agent and the at least one skill set are stored in skill records in a database.

25. An apparatus that provides assistance to an agent in a communication system, comprising:

means for determining skills of each agent of a plurality of agents;

means for storing the determined skills for respective agents of the plurality of agents as skill records in a database;

means for retrieving, when a predetermined agent of the plurality of agents requests to communicate with another of the agents of the plurality of agents, the skill record of the predetermined agent from the database;

means for comparing the skill record of the predetermined agent to the skill records of the other agents in the database;

means for selecting an agent from the plurality of agents based on the comparison of skill records; and means for establishing communication between the predetermined agent and the selected agent.

26. The apparatus according to claim 25, wherein the determined skills for agents are stored in skill records in a database.

27. The apparatus according to claim 26, wherein each of the skill records contains at least an agent identifier and at least one associated skill classification.

28. The apparatus according to claim 25, wherein a plurality of skill sets are predetermined, and wherein at least one skill set is associated with a respective agent of the plurality of agents, the at least one skill set being based on the determined skills of the respective agent.

29. The apparatus according to claim 28, wherein identification of the respective agent, and the association of the respective agent and the at least one skill set are stored in skill records in a database.

30. An apparatus that provides assistance to an agent of a plurality of agents in an automatic call distribution system, comprising:

a skill determination module that determines skills of each agent of the plurality of agents;

a database in which is stored as skill records the determined skills for respective agents of the plurality of agents, the database being operatively connected to the skill determination module;

a retrieving module operatively connected to the database that, when a predetermined agent of the plurality of agents requests to communicate with another of the agents of the plurality of agents, retrieves the skill record of the predetermined agent from the database;

a comparator having inputs for the skill record of the predetermined agent and the skill records of the other agents in the database, the comparator outputting comparisons of the skill records of the predetermined agent and the other agents;

a selector that receives the output of the comparator and in response thereto selects an agent from the plurality of agents based on the comparison of skill records; and a connection module that establishes communication between the predetermined agent and the selected agent.

31. The apparatus according to claim 30, wherein the determined skills for agents are stored in skill records in a database.

32. The apparatus according to claim 31, wherein each of the skill records contains at least an agent identifier and at least one associated skill classification.

33. The apparatus according to claim 30, wherein a plurality of skill sets are predetermined, and wherein at least one skill set is associated with a respective agent of the plurality of agents, the at least one skill set being based on the determined skills of the respective agent.

34. The apparatus according to claim 33, wherein identification of the respective agent, and the association of the respective agent and the at least one skill set are stored in skill records in a database.

*35. A method for providing assistance by an agent of a plurality of agents in a communication system, comprising:*

*determining skills of each agent of the plurality of agents in the communication system;*

*receiving a data messaging call request from a first agent of the plurality of agents;*

*selecting an agent from the plurality of agents to handle the data messaging call request based on a comparison by a comparator of the communication system of the determined skills of each of the plurality of agents with the determined skills of the first agent; and*

*a connection module of the communications system establishing communication between the first agent and the selected agent so that the selected agent provides assistance to the first agent.*

*36. The method of providing assistance as in claim 35 herein the data messaging call further comprises a chat call.*

*37. The method of providing assistance as in claim 35 further comprising storing the determined skills for respective agents of the plurality of agents in a database.*

*38. The method of providing assistance as in claim 37 wherein the first agent is a remote agent.*

*39. The method of providing assistance as in claim 38 further comprising retrieving a skill record of the remote agent from the database.*

*40. The method of providing assistance as in claim 39 wherein the selected agent further comprises an agent with a higher relative skill than the remote agent.*

*41. The method of providing assistance as in claim 40 further comprising connecting the caller with two or more agents of the plurality of agents.*

*42. An apparatus for providing assistance by an agent of a plurality of agents in a communication system, comprising:*

*an agent skill determination module that determines skills of each agent of the plurality of agents in the communication system;*

*a data messaging call request received from a first agent of the plurality of agents;*

*a selector that selects an agent from the plurality of agents to handle the data messaging call request based on a comparison of the determined skills of each of the plurality of agents with the determined skills of the first agent; and*

*an agent connection module that establishes communication between the first agent and the selected agent so that the selected agent provides assistance to the first agent.*

*43. The apparatus for providing assistance as in claim 42 wherein the data messaging call further comprises a chat call.*

*44. The apparatus for providing assistance as in claim 42 further comprising a database that stores the determined skills for respective agents of the plurality of agents.*

*45. The apparatus for providing assistance as in claim 44 wherein the first agent is a remote agent.*

*46. The apparatus for providing assistance as in claim 45 further comprising a skill record that is retrieved from the database.*

*47. The apparatus for providing assistance as in claim 39 further comprising a comparator that compares the skill record of the remote agent with the skill records of the plurality of agents to identify the selected agent.*

* * * * *